United States Patent
Nishitani

(10) Patent No.: US 10,186,988 B2
(45) Date of Patent: Jan. 22, 2019

(54) VIBRATION WAVE MOTOR AND DRIVER UTILIZING THE VIBRATION WAVE MOTOR

(71) Applicant: CANON KABUSHIKI KAISHA, Tokyo (JP)

(72) Inventor: Hitoshi Nishitani, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 230 days.

(21) Appl. No.: 15/182,732

(22) Filed: Jun. 15, 2016

(65) Prior Publication Data

US 2017/0005595 A1     Jan. 5, 2017

(30) Foreign Application Priority Data

Jul. 1, 2015    (JP) ................... 2015-132421
May 20, 2016    (JP) ................... 2016-101019

(51) Int. Cl.
     H02N 2/02      (2006.01)
     H02N 2/00      (2006.01)

(52) U.S. Cl.
     CPC ............. H02N 2/001 (2013.01); H02N 2/026 (2013.01)

(58) Field of Classification Search
     CPC ...... H02N 2/026; H02N 2/0015; H02N 2/103; H01L 41/0926; H01L 41/096
     USPC ............... 310/323.01–323.21, 328, 330–332
     See application file for complete search history.

(56) References Cited

U.S. PATENT DOCUMENTS

| | | | |
|---|---|---|---|
| 7,466,062 B2 | 12/2008 | Sakatani et al. | |
| 8,786,163 B2 | 7/2014 | Ashizawa | |
| 9,172,313 B2 | 10/2015 | Ohashi et al. | |
| 2009/0251026 A1* | 10/2009 | Kang | H02N 2/0015 310/323.16 |
| 2013/0147978 A1* | 6/2013 | Ohashi | G02B 27/646 348/208.7 |
| 2016/0118913 A1 | 4/2016 | Nishitani et al. | |
| 2016/0126449 A1 | 5/2016 | Osawa et al. | |
| 2016/0164436 A1 | 6/2016 | Nishitani | |

FOREIGN PATENT DOCUMENTS

| | | |
|---|---|---|
| CN | 1780134 A | 5/2006 |
| CN | 102545689 A | 7/2012 |
| CN | 103069600 A | 4/2013 |
| JP | 2006-115559 A | 4/2006 |
| JP | 2015-035947 A | 2/2015 |

OTHER PUBLICATIONS

Office Action dated Jun. 21, 2018, in Chinese Patent Application No. 201610481850.7.

* cited by examiner

*Primary Examiner* — Derek Rosenau
(74) *Attorney, Agent, or Firm* — Venable LLP

(57) ABSTRACT

The dimension in a moving direction of a vibration wave motor is shortened without impairing the thrust force, and the size of a driver is reduced. The vibration wave motor includes a vibrating plate having a substantially rectangular outline, a piezoelectric element bonded to the vibrating plate and configured to vibrate, and a protrusion provided to the vibrating plate or the piezoelectric element. The vibrating plate has a section not covered with the piezoelectric element inside a rectangular region encompassing the piezoelectric element within a plane where the piezoelectric element is bonded, and also has a notched portion along a straight line which passes through the section and is parallel to one side of the outline of the vibrating plate.

15 Claims, 15 Drawing Sheets

FIG. 3A
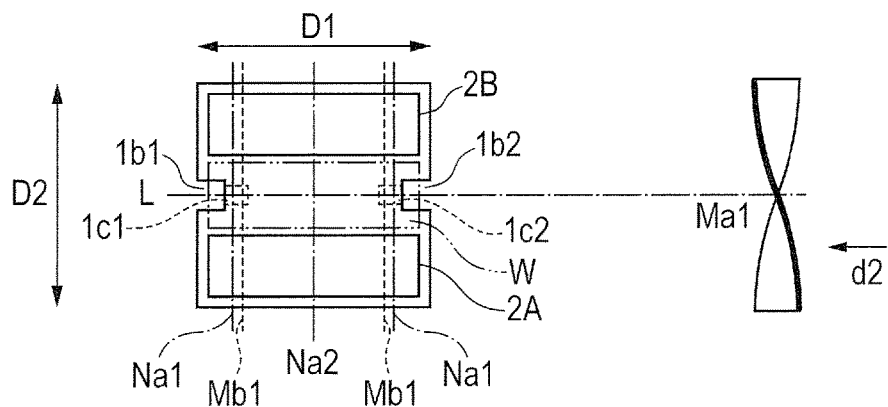
FIG. 3B
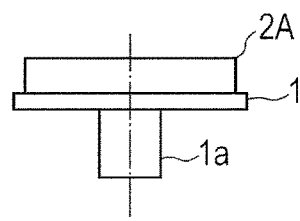
FIG. 3C
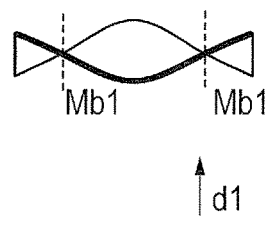
FIG. 3D
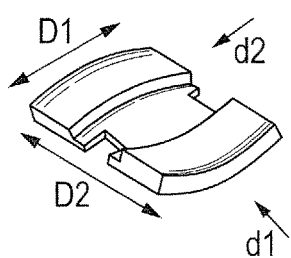
FIG. 3E
FIG. 3F
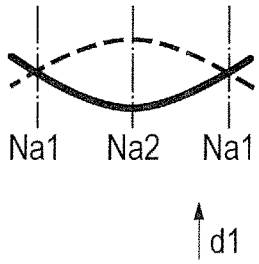
FIG. 3G
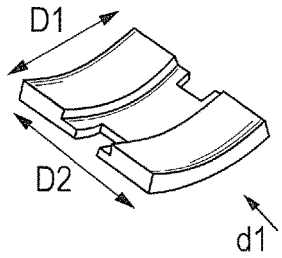

FIG. 4A
FIG. 4A1 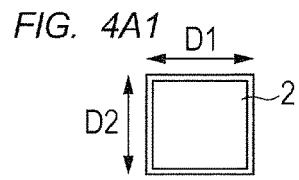
FIG. 4A2 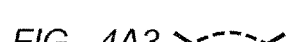
FIG. 4A3 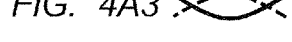
FIG. 4A4 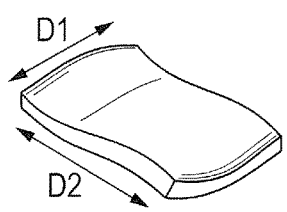
FIG. 4A5 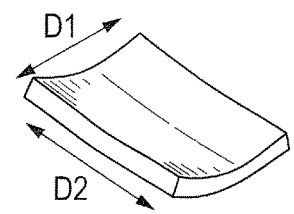
FIG. 4B
FIG. 4B1 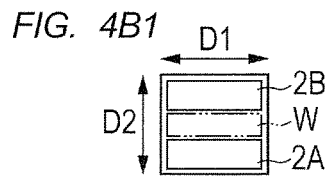
FIG. 4B2 
FIG. 4B3 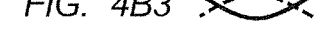
FIG. 4B4 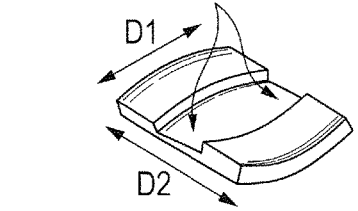
FIG. 4B5 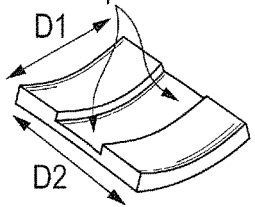
FIG. 4C
FIG. 4C1 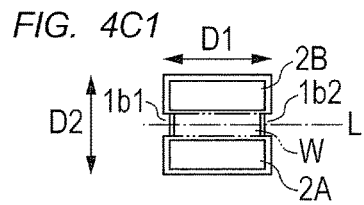
FIG. 4C2 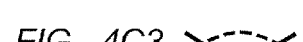
FIG. 4C3 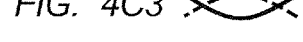
FIG. 4C4 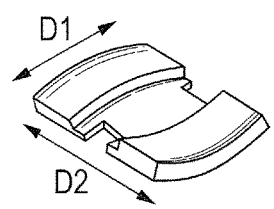
FIG. 4C5 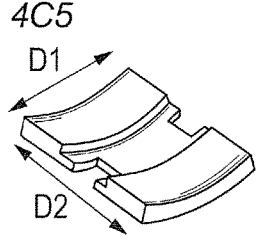
FIG. 4B6 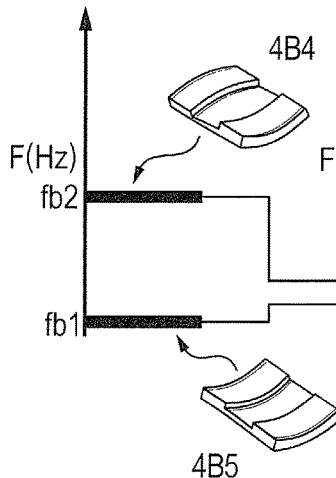
FIG. 4C6 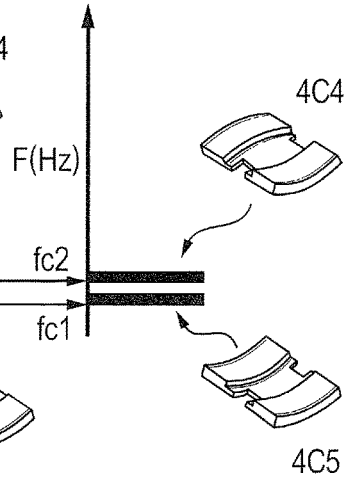

FIG. 5A
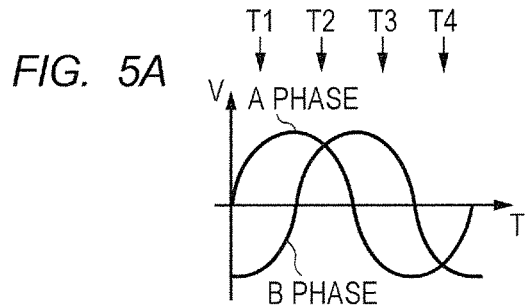
FIG. 5B
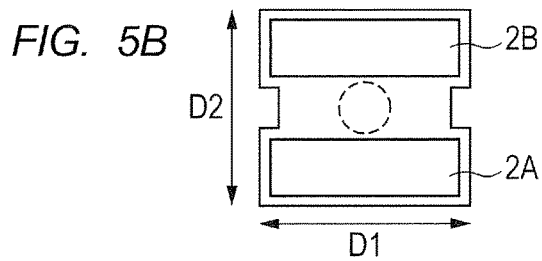
FIG. 5D
P1 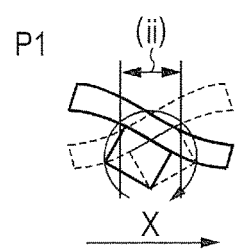
P2 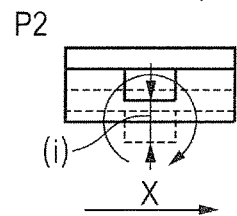
P3 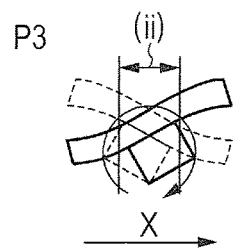
P4 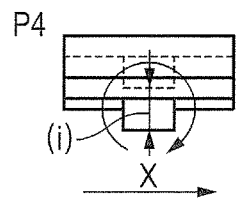
FIG. 5C
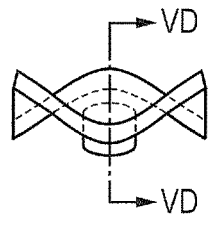
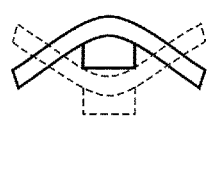
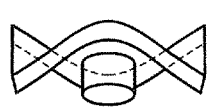
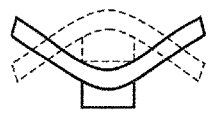

FIG. 6A
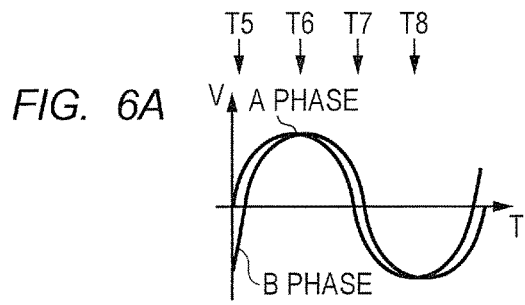
FIG. 6B
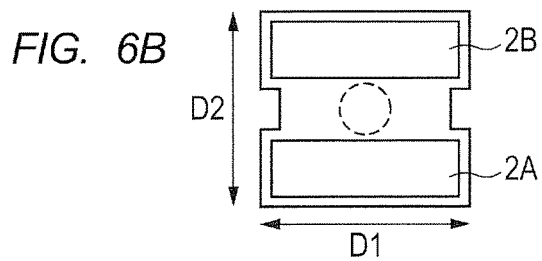
FIG. 6D
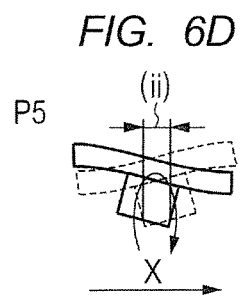
P5
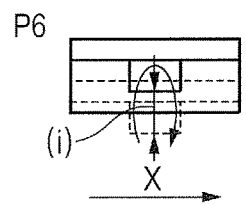
P6
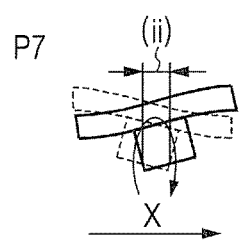
P7
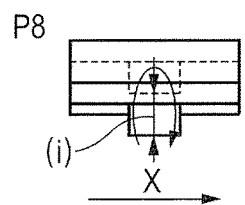
P8
FIG. 6C
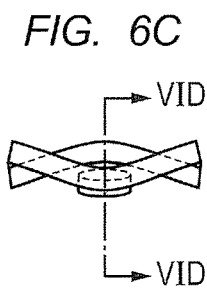
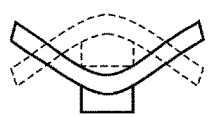

FIG. 7A
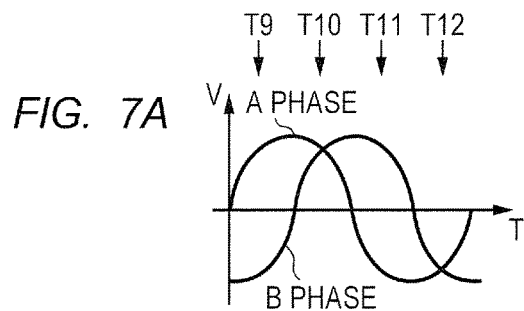
FIG. 7B
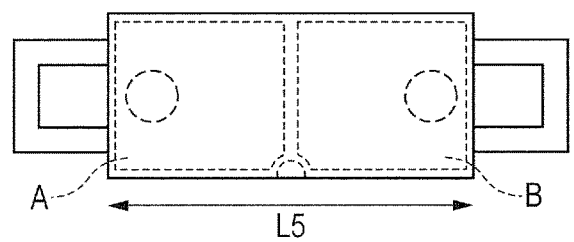
FIG. 7D
T9
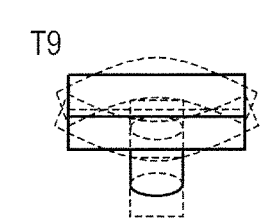
T10
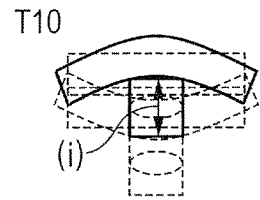
T11
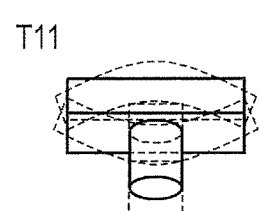
T12
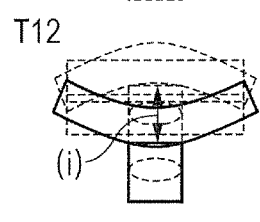
FIG. 7C
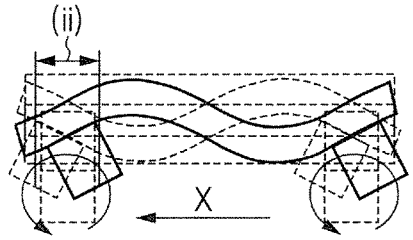
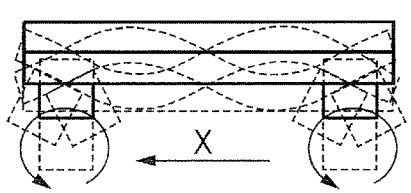
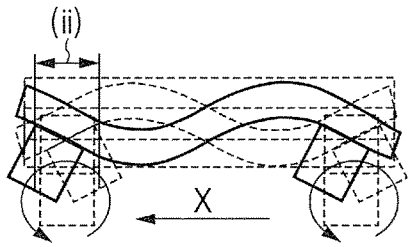
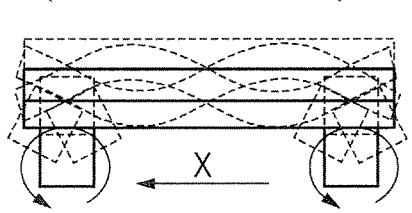

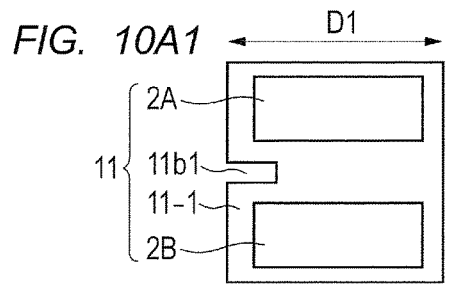
FIG. 10A1
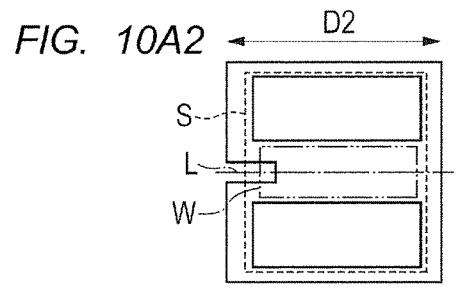
FIG. 10A2
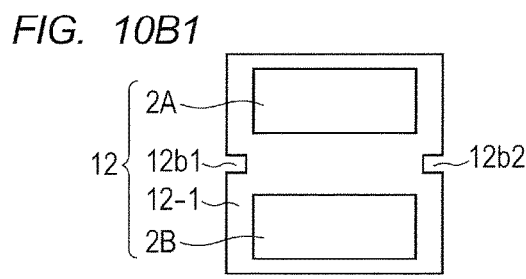
FIG. 10B1
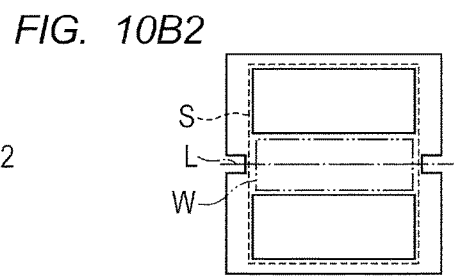
FIG. 10B2
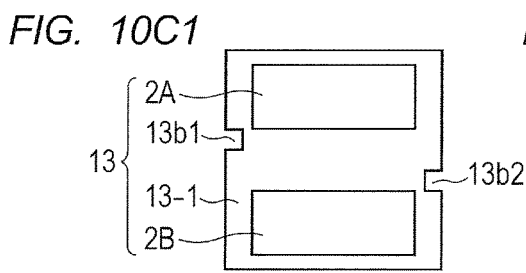
FIG. 10C1
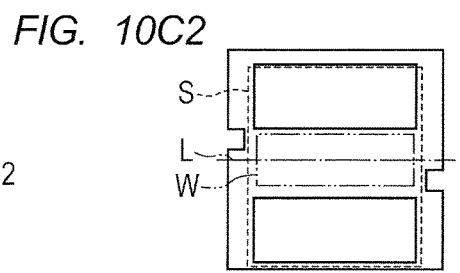
FIG. 10C2
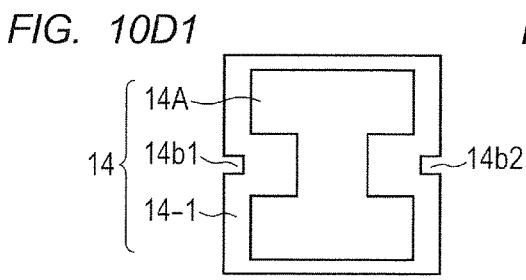
FIG. 10D1
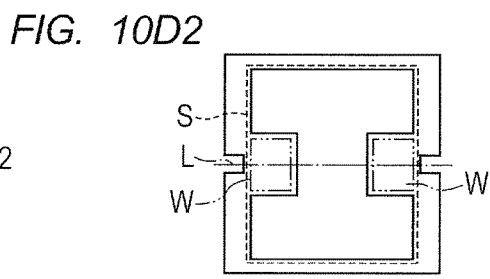
FIG. 10D2
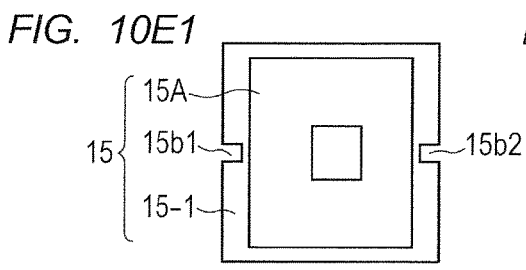
FIG. 10E1
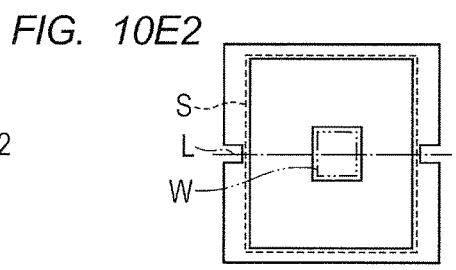
FIG. 10E2

FIG. 11A
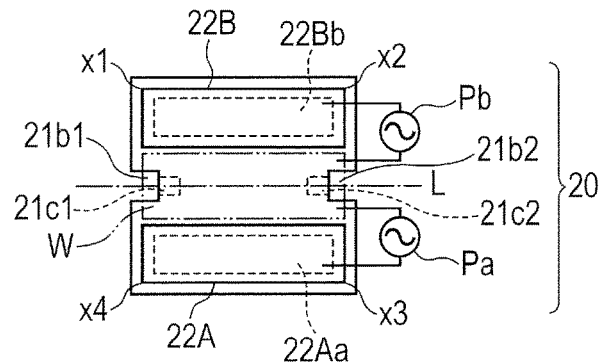
FIG. 11C
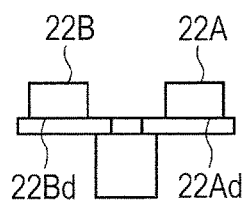
FIG. 11B
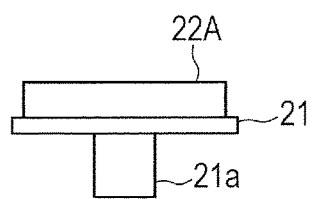
FIG. 11D
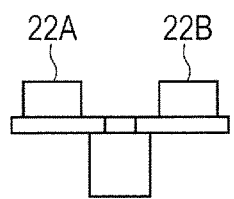
FIG. 11G
FIG. 11E
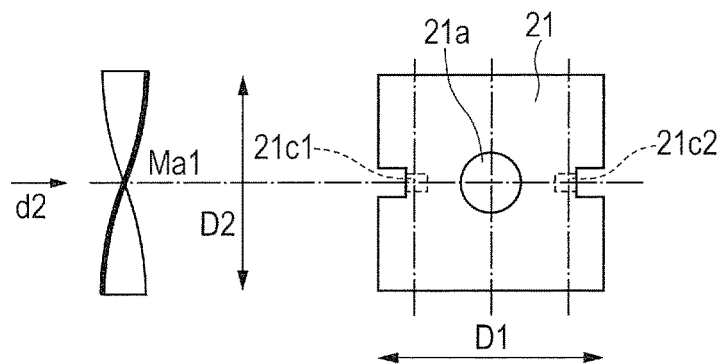
FIG. 11F
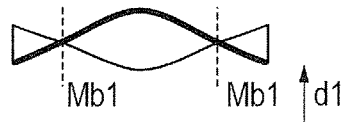
FIG. 11H
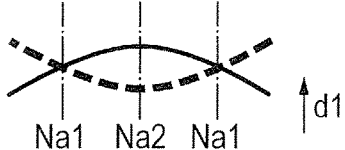

FIG. 14A
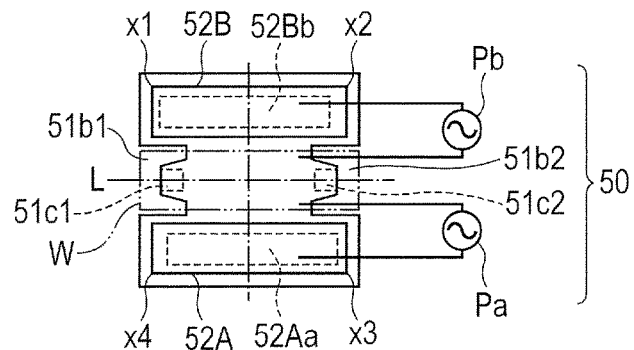
FIG. 14C
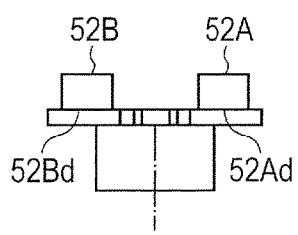
FIG. 14B
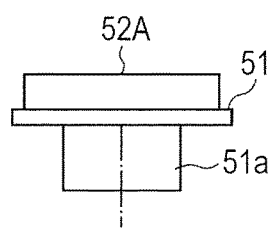
FIG. 14D
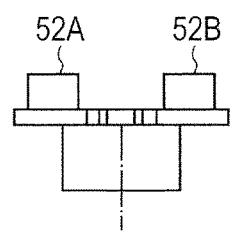
FIG. 14G    FIG. 14E
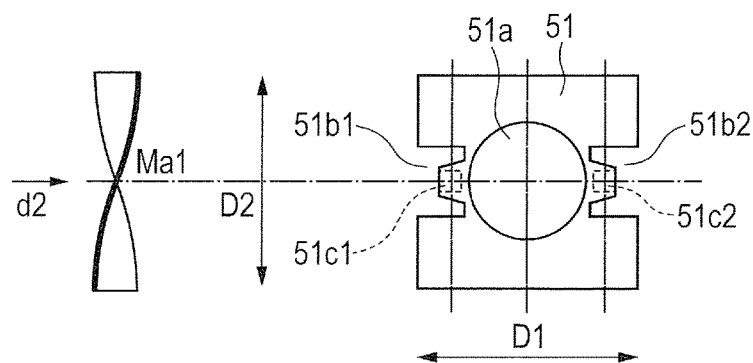
FIG. 14F
FIG. 14H
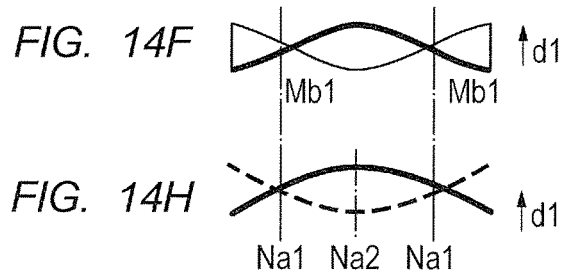

VIBRATION WAVE MOTOR AND DRIVER UTILIZING THE VIBRATION WAVE MOTOR

BACKGROUND OF THE INVENTION

Field of the Invention

The present invention relates to a plate-shaped elastic vibrator of a linear driving vibration wave motor, and relates to a driver utilizing the above-described vibration wave motor.

Description of the Related Art

Heretofore, ultrasonic motors characterized by small size, light weight, and high-speed and silent driving have been adopted in lens barrels of imaging devices, and so forth. For example, a linear driving ultrasonic motor is disclosed in FIGS. 8(a) to 12(c) of Japanese Patent Application Laid-Open No. 2015-35947. The ultrasonic motor disclosed in Japanese Patent Application Laid-Open No. 2015-35947 controls the phase difference between AC voltages applied to two phases of a piezoelectric element, thereby achieving an operation in a wide speed range. Moreover, a vibration wave driver prepared in consideration of the stiffness of a vibrator is disclosed in FIG. 6 of Japanese Patent Application Laid-Open No. 2006-115559.

Recently, the demand has been increased more and more for reducing the size of an electronic device in which an ultrasonic motor is mounted, particularly, for reducing the size of a lens driver. To achieve the reduction in the entire size of such a lens driver as shown in FIG. 12(b) of Japanese Patent Application Laid-Open No. 2015-35947, a vibrating plate of the ultrasonic motor is required to shorten a vibrating plate length L5 in a moving direction of the ultrasonic motor. However, simply uniformly shrinking the entire vibrating plate decreases the area of a piezoelectric element, and decreases the deformation attributable to the piezoelectric effect, thereby lowering the vibration amplitude. Moreover, reducing the entire dimensions of the piezoelectric element and the vibrating plate increases the resonance frequency, thereby further lowering the vibration amplitude. These consequently cause the thrust force of the ultrasonic motor to decrease. Hence, there is a limit to the shortening of the vibrating plate length L5 in the moving direction of the ultrasonic motor.

SUMMARY OF THE INVENTION

Accordingly, the present invention has been made in view of the above-described problems, and an object of the present invention is to shorten the dimension in a moving direction of a vibration wave motor (ultrasonic motor) without impairing the thrust force, and to provide a compact driver using the vibration wave motor.

In order to solve the above-described problems, a vibration wave motor of the present invention includes a vibrating plate having a substantially rectangular outline, a piezoelectric element bonded to the vibrating plate and configured to vibrate, and a protrusion provided to the vibrating plate or the piezoelectric element. The vibration wave motor is characterized as follows. The vibrating plate has a section W not covered with the piezoelectric element inside a rectangular region encompassing the piezoelectric element within a plane where the piezoelectric element is bonded. The vibrating plate has a notched portion along a straight line which passes through the section W and is parallel to one side of the outline of the vibrating plate.

According to the present invention, it is possible to shorten the dimension in a moving direction of the vibration wave motor without impairing the thrust force, and to achieve the size reduction of a driver by using this vibration wave motor.

Further features of the present invention will become apparent from the following description of exemplary embodiments with reference to the attached drawings.

BRIEF DESCRIPTION OF THE DRAWINGS

FIGS. 3A, 3B, 3C, 3D, 3E, 3F and 3G are each a view showing a natural vibration mode of the vibration wave motor according to the first embodiment.

FIG. 4A (including related FIGS. 4A1, 4A2, 4A3, 4A4, 4A5) is a view showing a resonance frequency response of the vibration wave motor according to the comparative example. FIG. 4B (including related FIGS. 4B1, 4B2, 4B3, 4B4, 4B5, 4B6) is a view showing a resonance frequency response of the vibration wave motor according to the comparative example. FIG. 4C (including related FIGS. 4C1, 4C2, 4C3, 4C4, 4C5, 4C6) is a view showing a resonance frequency response of the vibration wave motor according to the first embodiment.

FIGS. 5A, 5B, 5C and 5D are each a view showing a vibration mode of the vibration wave motor according to the first embodiment.

FIGS. 6A, 6B, 6C and 6D are each a view showing a vibration mode of the vibration wave motor according to the first embodiment.

FIGS. 7A, 7B, 7C and 7D are each a view showing a vibration behavior of a conventional ultrasonic motor.

FIGS. 10A1, 10A2, 10B1, 10B2, 10C1, 10C2, 10D1, 10D2, 10E1 and 10E2 are each a view showing a modified example of the vibrator 10 of the vibration wave motor according to the first embodiment.

FIGS. 11A, 11B, 11C, 11D, 11E, 11F, 11G and 11H are each a detailed view of a vibrator 20 of a vibration wave motor according to a second embodiment.

FIGS. 14A, 14B, 14C, 14D, 14E, 14F, 14G and 14H are each a detailed view of a vibrator 50 of a vibration wave motor according to a fifth embodiment.

DESCRIPTION OF THE EMBODIMENTS

Preferred embodiments of the present invention will now be described in detail in accordance with the accompanying drawings.

(First Embodiment)

Figure 1A:
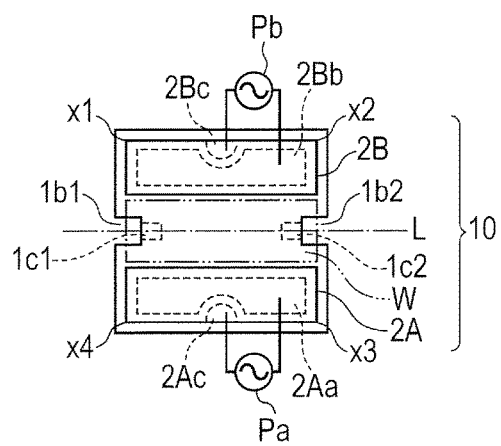
FIGS. 1A, 1B, 1C, 1D and 1E are each a detailed view of a vibrator 10 of a vibration wave motor according to a first embodiment.
Figure 1C:
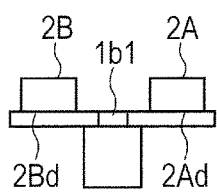
Figure 1B:
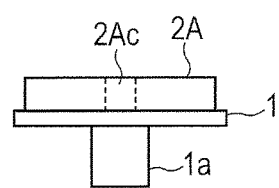
Figure 1D:
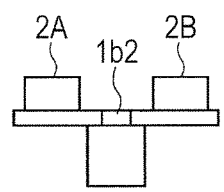
Figure 1E:
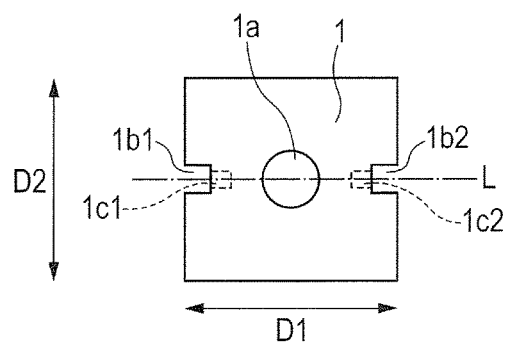

Hereinafter, a first embodiment for carrying out the present invention will be described. FIGS. 1A to 1E are views for illustrating a vibrator 10 of a vibration wave (ultrasonic) motor according to the first embodiment. FIG. 1A is a plan view, FIG. 1B is a front view, FIGS. 1C and 1D are side views, and FIG. 1E is a bottom view. A vibrating plate 1 has a substantially rectangular outline, and includes one protrusion 1a on a plane portion thereof. The protrusion 1a may be formed integrally with the vibrating plate 1 by raising or the like, or may be fixed, as a separate component, to the vibrating plate 1 by bonding or the like.

On an opposite surface of the plane portion of the vibrating plate 1 including the protrusion 1a are bonded piezoelectric elements 2A, 2B configured to generate vibrations (ultrasonic vibrations) corresponding to the number of vibrations in the ultrasonic range. The vibrator includes the vibrating plate 1, the piezoelectric elements 2A, 2B, and the protrusion 1a in an integrated manner. In the respective piezoelectric elements 2A, 2B, two sections, that is, sections 2Aa, 2Bb, are polarized in the same direction. The section 2Aa is assigned as an A phase, while the section 2Bb is assigned as a B phase. Sections 2Ac, 2Bc, which are not polarized, are electrodes used as grounds electrically connected to full-surface electrodes on back surfaces 2Ad, 2Bd of the piezoelectric elements 2A, 2B via side surfaces thereof. Note that the sections 2Ac, 2Bc may be located at any positions, as long as electrical conduction is possible from the full-surface electrodes on the back surfaces 2Ad, 2Bd of the piezoelectric elements 2A, 2B via the side surfaces.

The vibrating plate 1 is provided with notched portions 1b1, 1b2, which will be described later, along a straight line L. Further, connecting portions 1c1, 1c2 are provided within a range of section W, which will be described later, the range being indicated by a dotted line near the notched portions 1b1, 1b2. The connecting portions 1c1, 1c2 are directly or indirectly connected to a holding member 4 (not shown) configured to move in synchronism with the vibrating plate 1 as will be described later. The connecting portions 1c1, 1c2 can be made in a convex or concave shape or other shapes. The connection method includes not only a simple connection, but also can include connection methods by bonding, welding, or pressurization with spring or the like.

Figure 2A:
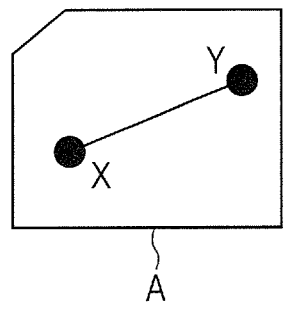
FIGS. 2A, 2B, 2C, 2D, 2E and 2F are each a view for illustrating a rectangular region encompassing piezoelectric elements, which is a feature according to the present invention.
Figure 2B:
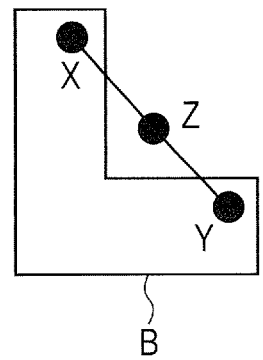
Figure 2C:
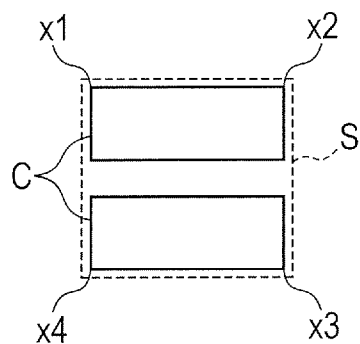
Figure 2D:
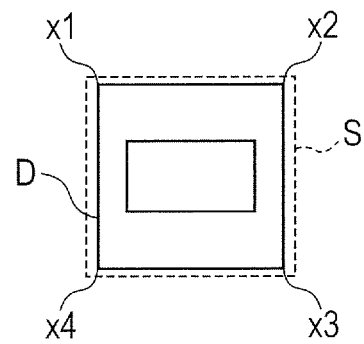
Figure 2E:
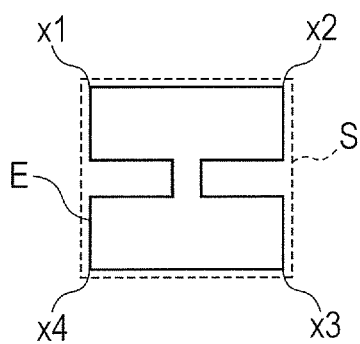
Figure 2F:
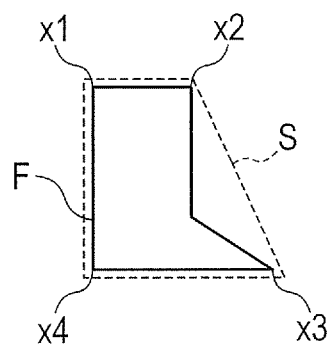

Now, a rectangular region encompassing the piezoelectric elements, which is a feature of the present invention, will be described using FIGS. 2A to 2F. As shown in, for example, FIG. 2A, a finite point set A contains a line segment connecting any two points such as a point X and a point Y. A set containing such a line segment connecting any two points is called a convex set. As shown in FIG. 2B, a finite point set B does not contain a point Z on the line segment connecting the two points X and Y. Hence, the point set B is not a convex set. Next, a point set C, a point set D, a point set E, and a point set F are convex sets as shown in FIGS. 2C, 2D, 2E, and 2F, respectively. These convex sets are minimum convex sets respectively containing the finite point sets C to F, and are quadrilaterals connecting all of vertexes x1 to x4 as indicated by a dotted line S. Thus, in FIG. 1A, a convex set of all the sections covered with the piezoelectric elements 2A, 2B is a rectangular region (rectangular region connecting the vertexes x1 to x4) encompassing the piezoelectric elements 2A, 2B.

Next, two features according to a structure of the vibrator 10 of the vibration wave motor according to the present embodiment will be described using FIG. 1A. First, the first feature according to the structure of the vibrator 10 is having the section W not covered with the piezoelectric elements 2A, 2B (the section is surrounded by a chain double-dashed line in the figure) inside the rectangular region encompassing the piezoelectric elements 2A, 2B within a plane of the vibrating plate 1 where the piezoelectric elements 2A, 2B are bonded. Hence, the section W has a structure including only the vibrating plate 1, so that the bending stiffness and the torsional stiffness in the section W are low in comparison with the other sections. Moreover, the section W is substantially line-symmetric with respect to the straight line L which is parallel to a direction D1 parallel to one side of the vibrating plate 1. Here, bending stiffness and torsional stiffness each mean the degree of how hard it is to change a dimension by bending or torsional force.

The second feature according to the structure of the vibrator 10 is that the vibrating plate 1 has the notched portions 1b1, 1b2 along the straight line L which passes through the section W and is parallel to the direction D1 parallel to one side of the vibrating plate 1. Hence, the bending stiffness and the torsional stiffness of the section W are further lowered. Moreover, the notched portions 1b1, 1b2 are substantially line-symmetric with respect to the straight line L which is parallel to the direction Dl parallel to one side of the vibrating plate 1. The effect of lowering the bending stiffness and the torsional stiffness by these first and second features according to the structure of the vibrator 10 will be described later.

Additionally, generating an ultrasonic vibration by applying, to the A phase and the B phase, AC voltages whose phase difference is changed at will with power feed means Pa, Pb is the same as that in the related art. Moreover, obtaining a larger ultrasonic vibration through a resonance phenomenon by matching or making closer resonance frequencies between a second natural vibration mode of a torsional vibration and a first natural vibration mode of a bending vibration at lower frequencies is also the same as that in the related art. Further, obtaining a larger ultrasonic vibration through a resonance phenomenon by applying AC voltages at frequencies close to the resonance frequencies is also the same as that in the related art. The vibrator 10 of the vibration wave motor according to the present invention includes the vibrating plate 1, the piezoelectric elements 2A, 2B, the protrusion 1a, and the power feed means Pa, Pb.

Next, a second natural vibration mode of a torsional vibration and a first natural vibration mode of a bending vibration generated by the vibrator 10 according to the present embodiment will be described in detail. FIG. 3A shows a plan view of the vibrator 10 in which the illustrations of polarized sections of the piezoelectric elements 2A, 2B, the power feed means Pa, Pb, and the like are omitted. FIG. 3B shows a front view of the vibrator 10. FIG. 3C shows a conceptual diagram of the second natural vibration mode of the torsional vibration in the direction D1 parallel to one side of the vibrating plate 1, seen in a direction of an arrow d1. FIG. 3D shows a perspective view for illustrating a vibration in the second natural vibration mode of the torsional vibration. FIG. 3E shows a conceptual diagram of the second natural vibration mode of the torsional vibration in a direction D2 parallel to one side of the vibrating plate 1, seen in a direction of an arrow d2. FIG. 3F shows a conceptual diagram of the first natural vibration mode of the bending vibration in the direction D1 parallel to one side of the vibrating plate 1, seen in the direction of the arrow d1. FIG. 3G shows a perspective view of a vibration in the first natural vibration mode of the bending vibration. Note that, in FIGS. 3C, 3E, and 3F, the illustrations of the protrusion 1a and the piezoelectric elements 2A, 2B are omitted.

In generating the second natural vibration mode of the torsional vibration as shown in FIGS. 3C and 3D, a torsion center axis Ma1 (first node) is generated as observed in the direction of the arrow d2 in FIG. 3E, and indicated by a chained line in FIG. 3A. On the other hand, as observed in the direction of the arrow d1 in FIG. 3C, second nodes Mb1 are generated in a direction orthogonal to the torsion center axis Ma1, and indicated by a dashed line in FIG. 3A. Moreover, in generating the first natural vibration mode of the bending vibration as shown in FIGS. 3F and 3G, nodes Na1 and an antinode Na2 are generated as observed in the direction of the arrow d1, and indicated by chained lines in FIG. 3A. The amount of the vibrating plate 1 deformed is smaller near these vibration nodes but larger near the vibration antinode.

Here, with reference to FIG. 3A, the sections provided with the connecting portions 1c1, 1c2 are located on the torsion center axis Ma1 (first node) of the second natural vibration mode of the torsional vibration and on the second nodes Mb1 and the nodes Na1 of the first natural vibration mode of the bending vibration. In this manner, the connecting portions 1c1, 1c2 are provided in the sections where the deformed amounts by the vibrations of the vibrating plate 1 and the piezoelectric elements 2A, 2B are small, so that the vibration of the vibrating plate 1 is hardly blocked. Note that the connecting portions 1c1, 1c2 are not limited to the positions shown in FIG. 3A, as long as the connecting portions 1c1, 1c2 are located near these vibration nodes. Further, since it is only necessary that the connecting portions 1c1, 1c2 be provided in sections where the amount of the vibrating plate 1 deformed is relatively small, the connecting portions 1c1, 1c2 are not limited to the positions of these vibration nodes.

Hereinafter, three features according to the vibration of the vibrator 10 of the vibration wave motor according to the present embodiment will be described. Hereinbelow, the first feature according to the vibration will be described using FIGS. 3A to 3G. It is that one of natural vibration modes at a resonance frequency matching with or similar to the resonance frequency of the second natural vibration mode of the torsional vibration in the direction D1 is the first natural vibration mode of the bending vibration in the direction D1 parallel to the torsion center axis Ma1 of the second natural vibration mode of the torsional vibration. This feature can be achieved by setting, to appropriate values, design values of the dimensions of the vibrating plate 1 in the direction D1 and the direction D2, the dimensions of the section W, the dimensions of the notched portions 1b1, 1b2, the thicknesses of the vibrating plate 1 and the piezoelectric elements 2A, 2B, the stiffnesses of the vibrating plate 1 and the piezoelectric elements 2A, 2B, and so on. Note that the combination of appropriate values of these design values is not just one, and various combinations can be set.

The second feature according to the vibration is that the protrusion 1a is provided at a position closer to the torsion center axis Ma1 (first node) than to the second nodes Mb1 of the second natural vibration mode of the torsional vibration as shown in FIGS. 3A, 3B and 3E. Note that the example in FIG. 3A is the best embodiment in which the protrusion 1a matches with the torsion center axis Ma1 (first node) and is provided at the furthermost position from the second nodes Mb1.

The third feature according to the vibration is that, with respect to the nodes Na1 and the antinode Na2 of the first natural vibration mode of the bending vibration as shown in FIGS. 3A and 3B, the protrusion 1a is provided at a position closer to the antinode Na2 than to the nodes Na1. Note that the example in FIG. 3A is the best embodiment in which the protrusion 1a matches with the antinode Na2 and is provided at the furthermost position from the nodes Na1.

FIGS. 4A1 to 4C6 show the first embodiment together with comparative examples. FIG. 4A is of a comparative example in which the dimension in the direction D1 of a conventional vibrator of a vibration wave motor is reduced for the size reduction of the vibrator. Nevertheless, in this comparative example, almost the entire surface of a plane portion of the vibrating plate is covered with a piezoelectric element 2. FIG. 4B is of a comparative example in which the configuration of the piezoelectric element 2 in FIG. 4A is provided with the above-described section W, that is, an example reflecting the first feature according to the structure. FIG. 4C is of the vibrating plate 1 in FIG. 1A according to the first embodiment, that is, an example reflecting, in addition to the first feature according to the structure, the second feature of the structure in which the vibrating plate 1 has the notched portions 1b1, 1b2 along the straight line L which passes through the section W and is parallel to the direction D1 of the vibrating plate 1. All of FIGS. 4A1, 4B1, and 4C1 are plan views.

FIGS. 4A2, 4B2, and 4C2 are conceptual diagrams each showing the second natural vibration mode of the torsional vibration in the direction D1 of the vibrating plate. FIGS. 4A3, 4B3, and 4C3 are conceptual diagrams showing the first natural vibration mode of the bending vibration in the direction D1 of the vibrating plate. FIGS. 4A4, 4B4, and 4C4 are perspective views each showing the second natural vibration mode of the torsional vibration. FIGS. 4A5, 4B5, and 4C5 are perspective views each showing the first natural vibration mode of the bending vibration. All the amounts of the vibrating plates deformed are exaggeratingly drawn. The embodiment shown in FIG. 4C or the like includes the first feature according to the vibration in which the natural vibration mode at the resonance frequency matching with or similar to the resonance frequency of the second natural vibration mode of the torsional vibration in the direction D1 of the vibrating plate is the first natural vibration mode of the bending vibration in the direction D1 of the vibrating plate. This is because each design value is set to an appropriate value. Normally, the resonance frequency of the second natural vibration mode of the torsional vibration in the direction D1 of the vibrating plate is higher than the resonance frequency of the first natural vibration mode of the bending vibration in the direction D1. This is because, in comparison between the torsional stiffness and the bending stiffness in the direction D1, the stiffness of the former is the higher. Note that, as described above, bending stiffness and torsional stiffness each mean the degree of how hard it is to change a dimension by bending or torsional force.

In comparison of the torsional stiffness in the direction D1 of the vibrating plate and the bending stiffness in the direction D1 of the vibrating plate 1 between the comparative example in FIG. 4A and the comparative example in FIG. 4B, both the stiffnesses of the comparative example in FIG. 4B are lower than those of the comparative example in FIG. 4A. This is because the comparative example in FIG. 4B has the section W which is the first feature according to the structure. Thus, the resonance frequency of the comparative example in FIG. 4B is also lower than that of the comparative example in FIG. 4A. Generally, if vibrators have equivalent sizes, a vibrator having the lower resonance frequency has the larger vibration amplitude. Hence, if vibration is possible at a lower frequency, an almost equivalent vibration amplitude can be obtained even when a vibration wave motor has a compact vibrator. Accordingly, vibration at the lower frequency of two resonance frequencies used for driving is advantageous for the size reduction of a vibration wave motor.

Next, in comparison of the torsional stiffness in the direction D1 of the vibrating plate 1 between the comparative example in FIG. 4B and the first embodiment in FIG. 4C, the torsional stiffness of the first embodiment in FIG. 4C is lower than that of the comparative example in FIG. 4B. Moreover, in comparison of the resonance frequency of the second natural vibration mode of the torsional vibration in the direction D1 of the vibrating plate 1, the resonance frequency of the first embodiment in FIG. 4C is lower than that of the comparative example in FIG. 4B (which will be described later, see FIGS. 4B6 and 4C6). These results are conceivably because the first embodiment in FIG. 4C has the notched portions 1b1, 1b2 which are the second feature according to the structure, so that portions P where stress is concentrated by torsional deformation in FIG. 4B4 are cut away in FIG. 4C4.

Moreover, in comparison of the resonance frequency of the first natural vibration mode of the bending vibration in the direction D1 of the vibrating plate 1 between the comparative example in FIG. 4B and the first embodiment in FIG. 4C, the resonance frequency of the first embodiment in FIG. 4C is higher than that of the comparative example in FIG. 4B (which will be described later, see FIGS. 4B6 and 4C6). This result is conceivably because the dimension corresponding to the full length of a beam of the first natural vibration mode of the bending vibration in the direction D1 of the vibrating plate is one complete side in the comparative example in FIG. 4B; on the other hand, in the first embodiment in FIG. 4C, portions corresponding to the notched portions 1b1, 1b2 are cut away, so that the dimension corresponding to the full length of a beam is substantially shorter.

FIG. 4B6 shows a distribution of the resonance frequencies in the comparative example in FIG. 4B, while FIG. 4C6 shows such a distribution in the first embodiment in FIG. 4C, where each vertical axis represents the resonance frequency. FIG. 4B6 shows a second resonance frequency fb2 of the torsional vibration in FIG. 4B4 of the comparative example and a first resonance frequency fb1 of the bending vibration in FIG. 4B5. FIG. 4C6 shows a second resonance frequency fc2 of the torsional vibration in FIG. 4C4 of the first embodiment and a first resonance frequency fc1 of the bending vibration in FIG. 4C5. By forming the configuration of the present invention, the second resonance frequency fb2 of the torsional vibration of the comparative example is decreased to the second resonance frequency fc2 of the torsional vibration of the first embodiment. On the other hand, the first resonance frequency fb1 of the bending vibration of the comparative example is increased to the first resonance frequency fc1 of the bending vibration of the first embodiment. As a result, the first embodiment in FIG. 4C enables the second resonance frequency fc2 of the torsional vibration to be close to the first resonance frequency fc1 of the bending vibration in comparison with the comparative example in FIG. 4B.

Generally, when vibrators having similar resonance frequencies are driven at a frequency near the resonance frequencies, the vibration amplitudes of the vibrators are increased. Thus, if vibrations are possible at two resonance frequencies which are frequencies used for driving and closer to each other by satisfying the second feature according to the structure, almost equivalent vibration amplitudes can be obtained even from a compact vibration wave motor. As a result, this is advantageous for the size reduction of a vibration wave motor.

FIG. 5A shows voltage waveforms of AC voltages applied to the piezoelectric elements 2A, 2B, the application being adjusted in such a manner as to delay the phase of the B phase by approximately +90° with respect to the A phase. FIG. 5B shows a plan view corresponding to FIG. 1A. FIG. 5C shows front views corresponding to FIG. 1B. FIG. 5D shows changes P1 to P4 in the vibration corresponding to temporal changes from times T1 to T4 in cross-sectional views taken along the cross-section line VD-VD in FIG. 5C. Note that the illustrations of the piezoelectric elements 2A, 2B are omitted. Further, relative to electrical change in the AC voltage in the times T1 to T4 shown in FIG. 5A, the changes P1 to P4 in the mechanical vibration shown in FIGS. 5C and 5D change with a predetermined mechanical response delay time. Moreover, the vibration amplitudes are exaggeratingly drawn.

After a predetermined mechanical response delay time from time (time T2, T4) when voltages of the same sign are applied to the A phase and the B phase, the A phase and the B phase similarly contract, and the amplitude of the first natural vibration mode of the bending vibration becomes a maximum (see (i) in FIG. 5D). Meanwhile, after a predetermined mechanical response delay time from time (time T1, T3) when voltages of different signs are applied to the A phase and the B phase, the A phase and the B phase contract in reverse directions, the amplitude of the second natural vibration mode of the torsional vibration becomes a maximum (see (ii) in FIG. 5D). As a result, a circular motion is generated by a tip end of the protrusion 1a as illustrated, so that a thrust force can be obtained in a direction of an arrow X. Moreover, when AC voltages are applied in such a manner as to advance the phase of the B phase by approximately +90° with respect to the A phase, a circular motion is generated in an opposite direction, so that a thrust force can be obtained in a reverse direction.

FIG. 6A shows voltage waveforms of the AC voltages applied to the piezoelectric elements 2A, 2B, the application being adjusted in such a manner as to cause almost no delay in the phase of the B phase with respect to the A phase. FIG. 6B shows a plan view corresponding to FIG. 1A. FIG. 6C shows front views corresponding to FIG. 1B. FIG. 6D shows changes P5 to P8 in the vibration corresponding to temporal changes from times T5 to T8 in cross-sectional views taken along the cross-section line VID-VID in FIG. 6C. In comparison with the case shown in FIG. 5A, since there is little time for applying voltages of different signs to the A phase and the B phase, the amplitude of the second natural vibration mode of the torsional vibration is quite small (see (ii) in FIG. 6D). As a result, a longitudinal elliptic motion is generated by the tip end of the protrusion 1a as illustrated, so that a thrust force can be obtained in the direction of the arrow X. In addition, the thrust force makes it possible to move the vibrator at quite a low speed.

Hereinafter, the effects of the present invention will be discussed while comparing the vibrator 10 of the vibration wave motor according to the first embodiment with a vibrator of a vibration wave motor in the related art. FIG. 7A shows voltage waveforms of the AC voltages applied to the piezoelectric elements A, B. FIG. 7B shows a plan view and FIG. 7C shows front views of the vibrator of the vibration wave motor according to a conventional example. FIG. 7D shows changes in the vibration corresponding to temporal changes from times T9 to T12 in cross-sectional views of the views of FIG. 7C. The vibrator of the vibration wave motor according to the conventional example shown in FIG. 7B moves in the direction of the arrow X, which is a direction parallel to a long side L5. In contrast, the vibrator 10 of the first embodiment moves in a direction parallel to one side shorter than the long side L5 (in the direction of the arrow X in FIG. 5D), the direction parallel to the long side L5 being the moving direction in the related art. Hence, it is possible to shorten the dimension in the moving direction of the vibration wave motor. Moreover, the piezoelectric elements 2A, 2B of the first embodiment have areas smaller than that of the piezoelectric elements of the conventional vibration wave motor. Nonetheless, by satisfying the above-described first and second features according to the structure, the vibrator 10 of the first embodiment can satisfy the first feature according to the vibration with the two resonance frequencies used for driving being lower and closer to each other. Hence, a vibration amplitude close to that of the conventional vibration wave motor ((ii) in FIG. 5D) is obtained, so that a thrust force equivalent to that of the conventional vibration wave motor can be obtained. As a result, the vibrator 10 can move along the shorter side as compared to the related art without greatly impairing the thrust force. This makes it possible to shorten the dimension in the moving direction of the vibration wave motor, and to achieve the size reduction of a driver by using this vibration wave motor. Note that, in the first embodiment, the description has been given of the example with the combination of the second natural vibration mode of the torsional vibration and the first natural vibration mode of the bending vibration. Nevertheless, similar effects can be obtained even if higher-order natural vibration modes are combined, as long as the above-described features are satisfied.

Figure 8A:
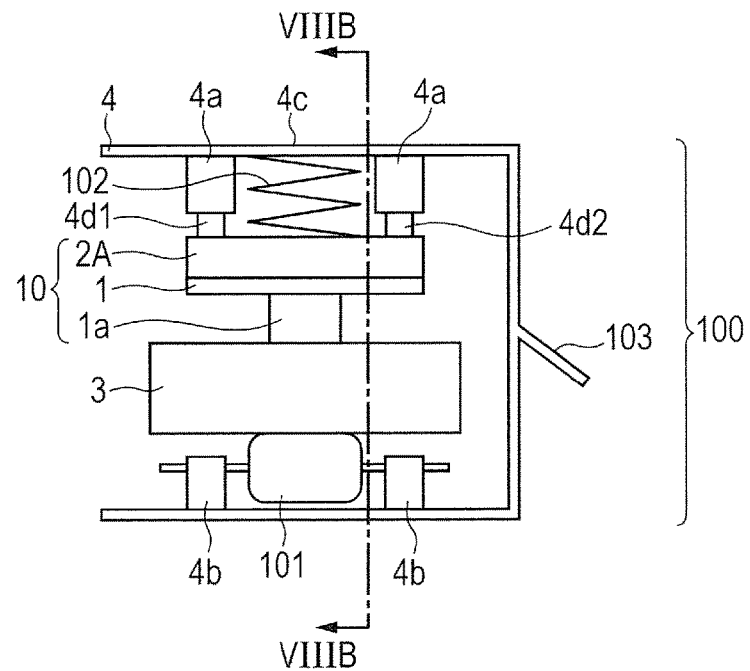
FIGS. 8A and 8B are each a view showing a linear driver 100 utilizing the vibration wave motor according to the first embodiment.
Figure 8B:
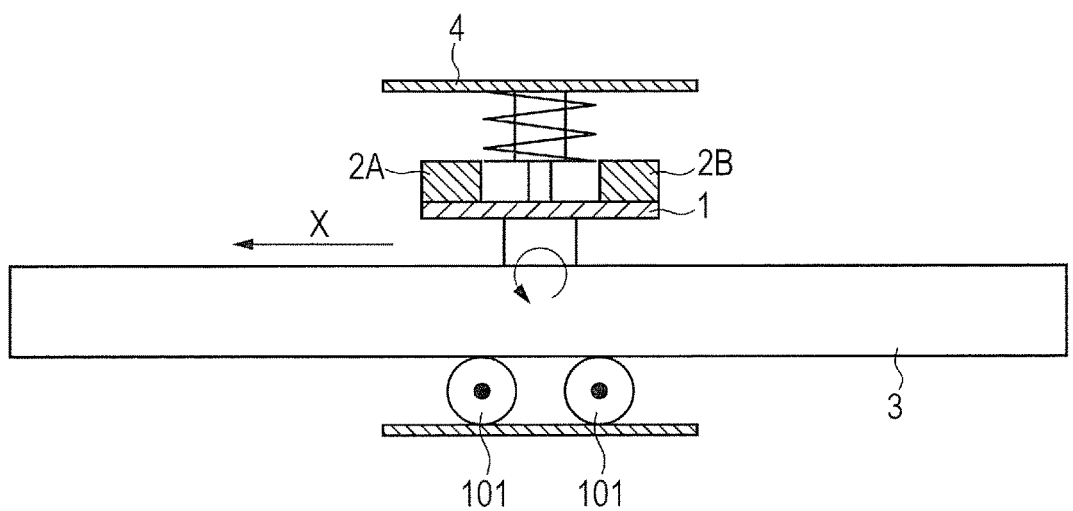

FIG. 8A shows a schematic view of a linear driver 100 utilizing the vibration wave motor of the present invention, seen in the moving direction of the vibration wave motor. FIG. 8B shows a cross-sectional view taken along the cross-section line VIIIB-VIIIB in FIG. 8A. A friction member 3 is configured to come into contact with the protrusion 1a of the vibrating plate 1, and the vibrator 10 is configured to relatively move by the ultrasonic vibration of the vibrating plate 1. The vibrating plate 1 is capable of moving relatively to the friction member 3 in a direction orthogonal to the torsion center axis Ma1 on the substantially rectangular surface of the vibrating plate 1. The holding member 4 is connected to the connecting portions 1c1, 1c2 of the vibrating plate 1 at end portions 4d1, 4d2 of a support 4a, and configured to support the vibrating plate 1. Moreover, at a shaft portion 4b, the holding member 4 is configured to rotatably and pivotally support a roller 101 configured to rotationally slide on a back surface of the friction member 3. In other words, the holding member 4 is a member configured to move in synchronism with the vibrating plate 1. A pressurization spring 102 has a lower end configured to act on the piezoelectric elements 2A, 2B, and an upper end configured to act on the holding member 4 at a receiver 4c. A driving transmitter 103 is a member configured to connect the holding member 4 to a driven object, which will be described later.

The protrusion 1a comes into pressure contact with the friction member 3 by a pressurization force of the pressurization spring 102. The holding member 4 obtains a thrust force in an X direction in FIG. 8B by a driving force of a circular motion as indicated by the arrows in FIGS. 5D and 6D. Note that the roller 101 is provided to reduce the sliding resistance during driving, and may be such a mechanism as a rolling ball. Moreover, the roller 101 may be configured to slide directly with a sliding friction, provided that the sliding resistance is allowable. In the linear driver 100 in FIG. 8A with such a configuration, the driving direction of the vibrator 10 of the vibration wave motor is the direction D2 orthogonal to the torsion center axis Ma1 on the substantially rectangular surface of the vibrating plate 1.

As has been described above, the vibrator 10 of the vibration wave motor according to the first embodiment satisfies the first and second features according to the structure, so that the two resonance frequencies used for driving are lower and closer to each other. As a result, it is possible to shorten the dimension in the moving direction of the vibration wave motor without impairing the thrust force, and to achieve the size reduction of the linear driver by using this vibration wave motor.

Figure 9A:
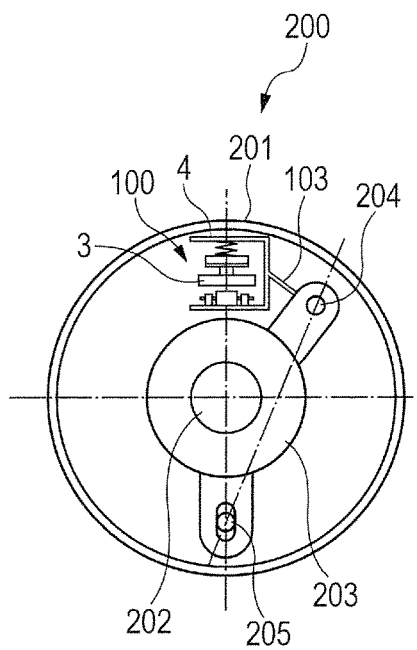
FIGS. 9A, 9B and 9C are each a view showing a lens driver 200 utilizing the vibration wave motor according to the first embodiment.
Figure 9B:
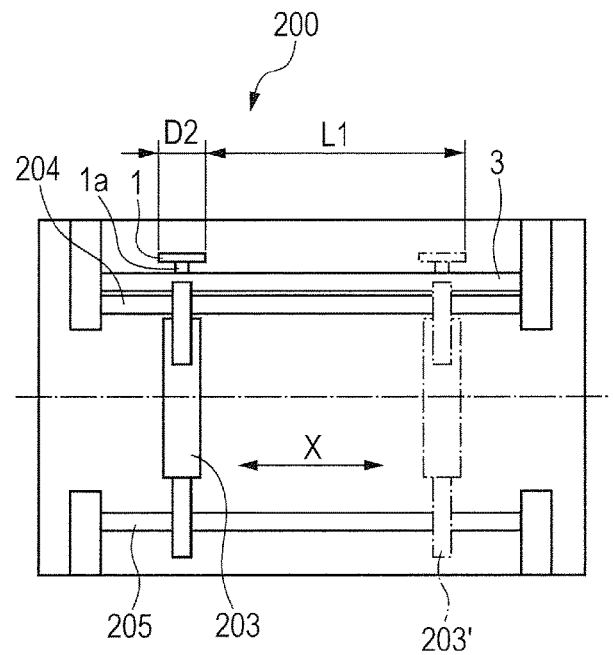
Figure 9C:
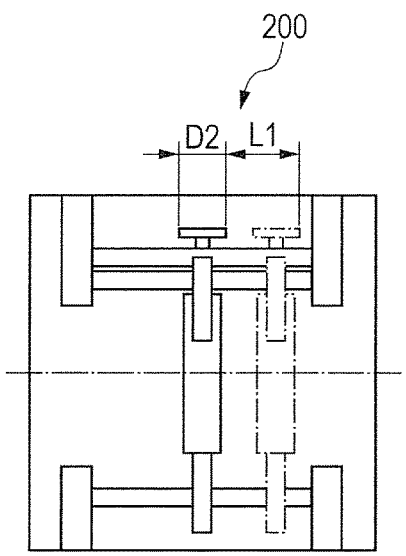
Figure 12A:
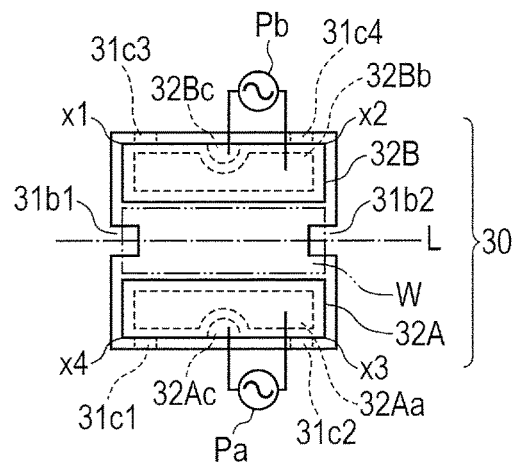
FIGS. 12A, 12B, 12C, 12D, 12E, 12F, 12G and 12H are each a detailed view of a vibrator 30 of a vibration wave motor according to a third embodiment.
Figure 12C:
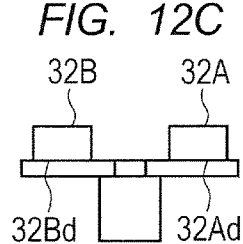
Figure 12B:
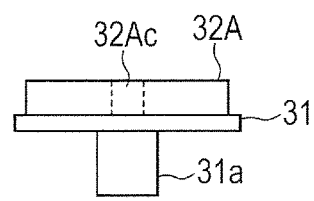
Figure 12D:
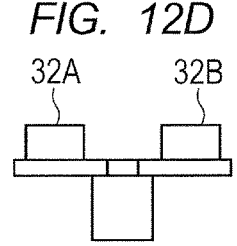
Figures 12E, 12G:
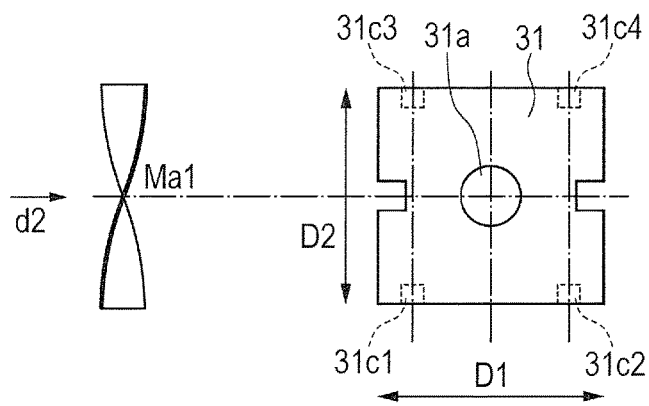
Figure 12F:
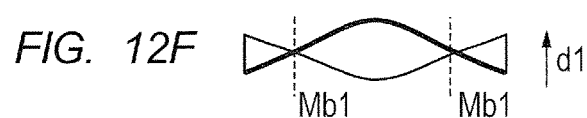
Figure 12H:
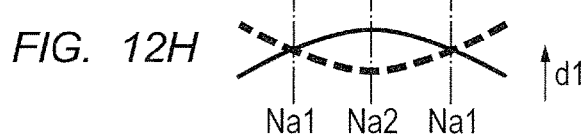
Figure 13A:
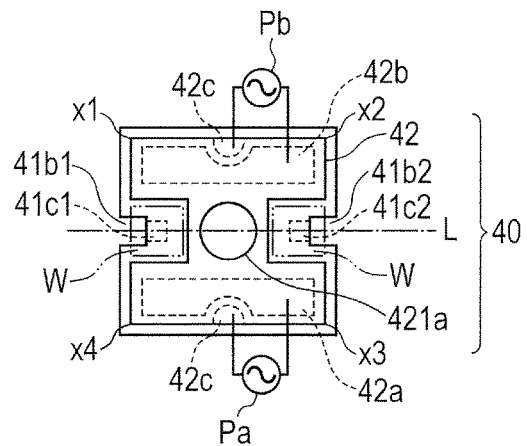
FIGS. 13A, 13B, 13C, 13D, 13E, 13F, 13G and 13H are each a detailed view of a vibrator 40 of a vibration wave motor according to a fourth embodiment.
Figure 13C:
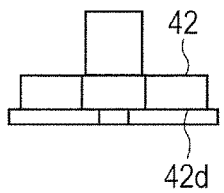
Figure 13B:
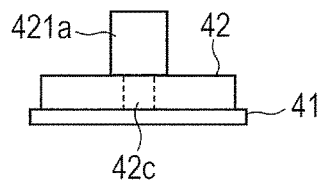
Figure 13D:
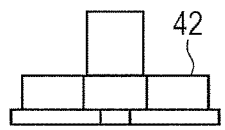
Figures 13E, 13G:
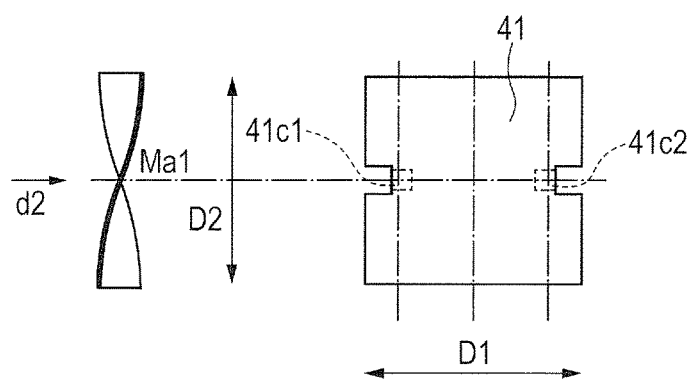
Figure 13F:
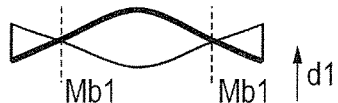
Figure 13H:
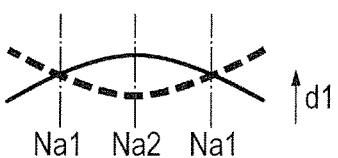

FIG. 9A shows a front view, in an optical axis direction, of a lens driving unit of a lens driver 200 in which the linear driver 100 utilizing the vibration wave motor of the present invention is mounted. FIGS. 9B and 9C show side views in which a portion of a frame body 201 is removed. Note that FIG. 9C is of the lens driver 200 whose size is further reduced in comparison with FIG. 9B. The frame body 201 is configured to fix the friction member 3. A lens 202 is held by a lens holder 203. The lens holder 203 is supported by a guide shaft 204 and a guide shaft 205 and also guided in the optical axis direction (in the direction of the arrow X). Note that, in the linear driver 100 in FIG. 9B, the illustrations of the members other than the vibrating plate 1 and the friction member 3 are omitted.

The vibrating plate 1 moves along the friction member 3 fixed to the frame body 201. In synchronism with this, the holding member 4 moves. The lens holder 203 is the driven object connected to the holding member 4 by the driving transmitter 103, and moves in synchronism with the holding member 4. When the holding member 4 moves a certain distance in the X direction according to a movement command from an unillustrated microcomputer, the lens holder 203 can move by a distance L1. In the lens driver 200 in FIG. 9B with such a configuration, the driving direction of the vibration wave motor is the direction D2 orthogonal to the torsion center axis Ma1 on the substantially rectangular surface of the vibrating plate 1.

As has been described above, utilizing the vibration wave motor according to the first embodiment makes it possible to achieve the size reduction of the lens driver 200. Note that, in the first embodiment, the description has been given of the example in which the vibrating plate 1 moves along the fixed friction member 3. Nevertheless, the friction member 3 may move along the fixed vibrating plate 1 alternatively. With such a configuration, the size reduction can be achieved, and the same effects are exhibited.

FIGS. 10A1 to 10E1 show modified examples of the first embodiment of the present invention. In FIGS. 10A1 to 10C1, vibrators 11 to 13 of the vibration wave motor have the piezoelectric elements 2A, 2B which are piezoelectric elements divided into two as in the first embodiment. In FIGS. 10D1 and 10E1, vibrators 14, 15 of the vibration wave motor respectively have piezoelectric elements 14A, 15A which are integrated piezoelectric elements. Moreover, all of the vibrators 11 to 15 of the vibration wave motor have the above-described sections W. The vibrators 11 to 14 of the vibration wave motor are each provided with a notched portion near the section W. Note that, in the vibrator 15 of the vibration wave motor, the section W is provided in a substantially rectangular shape at a central portion of a vibrating plate 15-1, but notched portions 15b1, 15b2 are not provided near the section W. Moreover, each section W is substantially line-symmetric with respect to the straight line L which is parallel to the direction D1 parallel to one side of the vibrating plate respectively. Further, each notched portion is substantially symmetric with respect to the straight line L which is parallel to the direction D1 parallel to one side of the vibrating plate respectively.

Hereinafter, features of the above-described modified examples will be described. The vibrator 11 of the vibration wave motor has one notched portion 11$b$1 which is provided to a vibrating plate 11-1, and which has a relatively long shape. The vibrator 12 has notched portions 12$b$1 and 12$b$2 respectively provided to right and left sides of a vibrating plate 12-1 and on the same axis. The vibrator 13 has notched portions 13$b$1 and 13$b$2 respectively provided on right and left sides of a vibrating plate 13-1 but on different axes. The vibrator 14 has notched portions 14$b$1 and 14$b$2 respectively provided on right and left sides of a vibrating plate 14-1 and on the same axis. The integrated piezoelectric element 14A has a shape constricted in the direction D1 to form the section W on the vibrating plate 14-1. The vibrator 15 has the notched portions 15$b$1 and 15$b$2 respectively provided on right and left sides of the vibrating plate 15-1 and on the same axis. The integrated piezoelectric element 15A has a shape with a substantially rectangular opening to form the section W at a central portion thereof.

As shown in FIGS. 10A2 to 10E2, every vibrating plate includes the section W not covered with the piezoelectric element(s) (the section is indicated by a chain double-dashed line in the FIGURE) inside a rectangular region encompassing all the piezoelectric element(s) (the rectangular region is indicated by a dotted line S in the FIGURE) within a plane where the piezoelectric element(s) are bonded. Moreover, the vibrating plate includes the notched portion(s) along the straight line L (chained line in the FIGURE) which passes through the section W and is parallel to one side of the vibrating plate. Thus, all the modified examples have the first and second features according to the structure. As a result, the above-described first feature according to the vibration can be satisfied with the two resonance frequencies used for driving being lower and similar to each other, and effects equivalent to those of the vibration wave motor according to the first embodiment are obtained. Note that although the piezoelectric elements divided into two have been described as an example, the number of the piezoelectric elements is not limited to two, and two or more piezoelectric elements can be provided in some cases.

(Second Embodiment)

Hereinafter, a second embodiment for carrying out the present invention will be described. FIGS. 11A to 11H are views showing a vibrator 20 of a vibration wave motor according to the second embodiment. Hereinbelow, only differences from the first embodiment will be described. Piezoelectric elements 22A, 22B are bonded to an opposite surface of a vibrating plate 21 to a protrusion 21$a$, and configured to ultrasonically vibrate by application of AC voltages. In the piezoelectric elements 22A, 22B, two sections 22Aa and 22Bb are polarized in the same direction. The section 22Aa is assigned as an A phase, while the section 22Bb is assigned as a B phase. Unlike the first embodiment, all sections are polarized, and there is no fold-back electrode. Hence, the vibrating plate 21 itself serves as a ground via surfaces 22Ad, 22Bd where the piezoelectric elements 22A, 22B are bonded to the vibrating plate 21. As a result, an ultrasonic vibration can be generated by applying, to the A phase and the B phase via the vibrating plate 21, AC voltages whose phases are changed at will with the power feed means Pa, Pb. Besides, the two features according to the structure, the three features according to the vibration, and so forth are the same as those in the first embodiment.

Even with such a configuration, it is possible to shorten the dimension in the moving direction of the vibrator 20 of the vibration wave motor without impairing the thrust force, and to achieve the size reduction of a lens driver by using the vibrator 20 of this vibration wave motor, as in the case of the first embodiment. Note that modified examples and the like of this embodiment are also the same as those in the first embodiment.

(Third Embodiment)

Hereinafter, a third embodiment for carrying out the present invention will be described. FIGS. 12A to 12H are views showing a vibrator 30 of a vibration wave motor according to the third embodiment. Hereinbelow, only differences from the first embodiment will be described. Ranges indicated by dotted lines are connecting portions 31$c$1, 31$c$2, 31$c$3, 31$c$4 directly or indirectly connected to the above-described but unillustrated holding member 4 configured to move in synchronism with a vibrating plate 31. The connecting portions 31$c$1 to 31$c$4 are not only simply connected, but also may be pressurized with spring or the like. Unlike the first embodiment, the connecting portions 31$c$1 to 31$c$4 are provided to border portions of the vibrating plate 31.

The portions provided with the connecting portions 31$c$1 to 31$c$4 are located near the second nodes Mb1 of the second natural vibration mode of the torsional vibration and the nodes Na1 of the first natural vibration mode of the bending vibration. In this manner, the connecting portions 31$c$1 to 31$c$4 are provided at the portions where the deformed amounts by the vibrations of the vibrating plate 31 and piezoelectric elements 32A, 32B are small, so that the vibration of the vibrating plate 31 is hardly blocked. Note that the connecting portions 31$c$1 to 31$c$4 are not limited to the positions in FIG. 12E, as long as the connecting portions 31$c$1 to 31$c$4 are located near the second nodes Mb1 of the second natural vibration mode of the torsional vibration and the nodes Na1 of the first natural vibration mode of the bending vibration. Further, since it is only necessary that the connecting portions 31$c$1 to 31$c$4 be provided at portions where the deformed amounts by the vibrations of the vibrating plate 31 and the piezoelectric elements 32A, 32B are small, the connecting portions 31$c$1 to 31$c$4 are not limited to the positions of the vibration nodes. Besides, the two features according to the structure, the three features according to the vibration, and so forth are the same as those in the first embodiment.

Even with such a configuration, it is possible to shorten the dimension in the moving direction of the vibrator 30 of the vibration wave motor without impairing the thrust force, and to achieve the size reduction of a lens driver by using the vibrator 30 of this vibration wave motor, as in the case of the first embodiment. Note that modified examples and the like of this embodiment are also the same as those in the first embodiment.

(Fourth Embodiment)

Hereinafter, a fourth embodiment for carrying out the present invention will be described. FIGS. 13A to 13H are views showing a vibrator 40 of a vibration wave motor according to the fourth embodiment. Hereinbelow, only differences from the first embodiment will be described. A piezoelectric element 42 is bonded to a vibrating plate 41, and configured to ultrasonically vibrate by application of AC voltages. In the piezoelectric element 42, two sections 42$a$, 42$b$ are polarized in the same direction. Among these, the section 42*a* is assigned as an A phase, while the section 42*b* is assigned as a B phase. Sections 42*c*, which are not polarized, are electrodes used as grounds electrically connected to a full-surface electrode on a back surface 42*d* of the piezoelectric element 42 via a side surface thereof. One protrusion 421*a* is bonded on the piezoelectric element 42. Moreover, the two sections W not covered with the piezoelectric element are provided. Besides, the two features according to the structure, the three features according to the vibration, and so forth are the same as those in the first embodiment.

Even with such a configuration, it is possible to shorten the dimension in the moving direction of the vibration wave motor without impairing the thrust force, and to achieve the size reduction of a lens driver by using this vibration wave motor, as in the case of the first embodiment. Note that modified examples and the like of this embodiment are also the same as those in the first embodiment.

(Fifth Embodiment)

Figure 15:
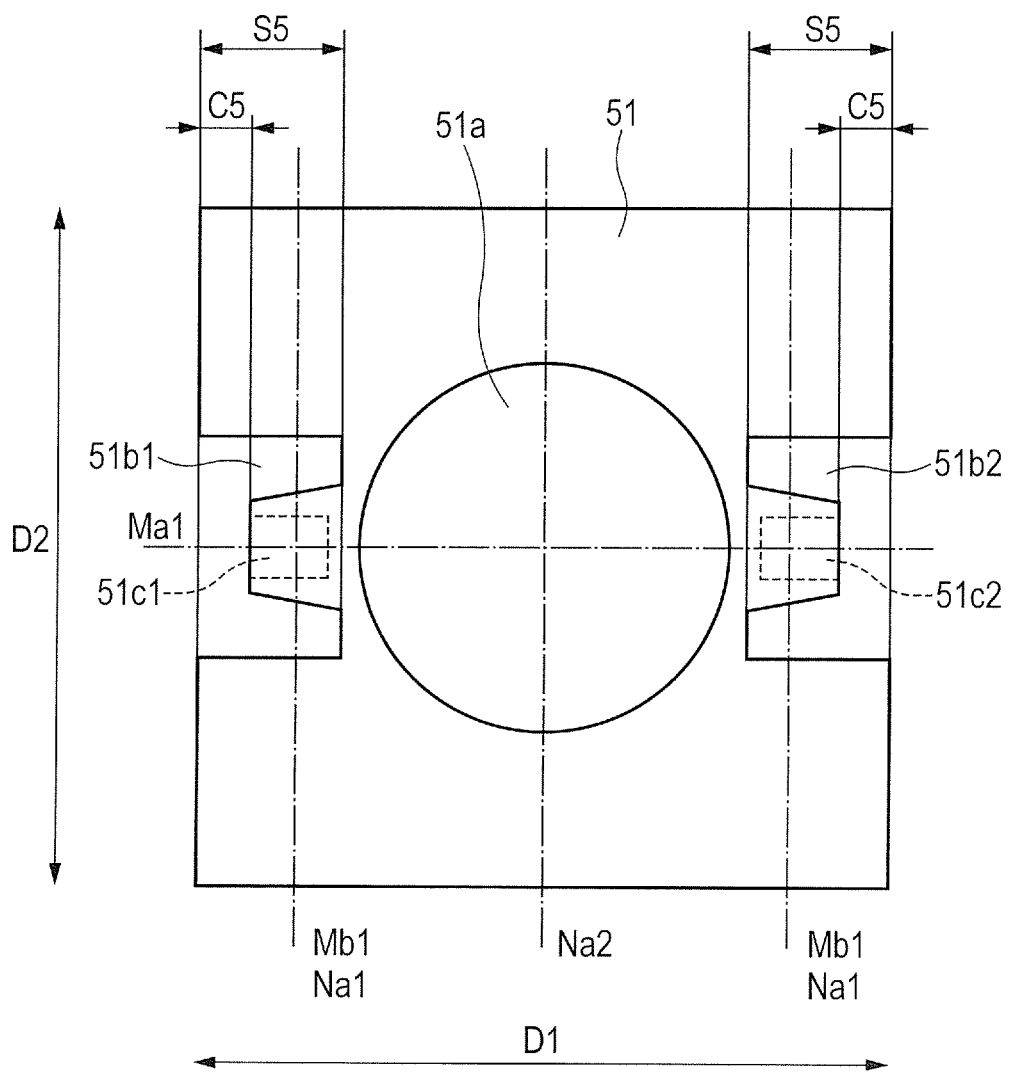
FIG. 15 is an enlarged view a vibrating plate 51 of the vibration wave motor according to the fifth embodiment.

Hereinafter, a fifth embodiment for carrying out the present invention will be described. FIGS. 14A to 14H are views showing a vibrator 50 of a vibration wave motor according to the fifth embodiment. FIG. 15 is an enlarged view of a vibrating plate 51 of the vibration wave motor according to the fifth embodiment, and is obtained by enlarging FIG. 14E. Ranges indicated by dotted lines are connecting portions 51*c*1, 51*c*2 directly or indirectly connected to the above-described but unillustrated holding member 4 configured to move in synchronism with the vibrating plate 51, as in the case of the first embodiment. Hereinbelow, only differences from the first embodiment will be described.

As shown in FIG. 15, the vibrating plate 51 is provided with notched portions 51*b*1, 51*b*2 on sides opposite to each other. Since the notched portion 51*b*2 has the same features as the notched portion 51*b*1, the features of the notched portion 51*b*1 will be described in detail below. The notched portion 51*b*1 has a shape with two jutting portions in the direction D1 orthogonal to the direction D2 parallel to one side of the vibrating plate 51 where the notched portion 51*b*1 is provided. Between the two jutting portions of the notched portion 51*b*1, a near-central portion is formed which has a dimension C5 shorter than a dimension S5 from one side of the vibrating plate 51 where the notched portion 51*b*1 is provided to the two jutting portions. The same applies to the notched portion 51*b*2.

In a case where the notched portion 51*b*1 has a large dimension in the direction D1, since a portion where stress is concentrated by torsional deformation is greatly cut away, the resonance frequency fc2 of the second natural vibration mode of the torsional vibration is decreased, as described in the first embodiment. Moreover, increasing the dimension in the direction D1 of the notched portion 51*b*1 substantially shortens the dimension corresponding to the full length of a beam. Accordingly, the resonance frequency fc1 of the first natural vibration mode of the bending vibration is also increased, as described in the first embodiment. As a result, these two resonance frequencies can be close to each other, and this is advantageous for the size reduction of the vibration wave motor.

Suppose a case where the dimensions in the direction D1 of the notched portions 51*b*1, 51*b*2 are simply increased. In this case, when the end portions 4*d*1, 4*d*2 of the support 4*a* of the holding member 4 are fixed to the connecting portions 51*c*1, 51*c*2 of the vibrating plate 51 as exemplified in the first embodiment, the following two problems may arise. The first problem is that if the notched portions 51*b*1, 51*b*2 extend to the vibration nodes, the connecting portions 51*c*1, 51*c*2 cannot be provided at the vibration nodes, and consequently the connecting portions 51*c*1, 51*c*2 are provided in sections deformed by the vibration in considerable amounts, blocking the vibration of the vibrating plate 51. The second problem is that when the end portions 4*d*1, 4*d*2 of the support 4*a* of the holding member 4 are fixed to the connecting portions 51*c*1, 51*c*2 of the vibrating plate 51, a sufficient area for the fixation by welding, bonding, or the like cannot be guaranteed sometimes because of the protrusion 51*a*.

Nevertheless, in the present embodiment, the shape of the notched portion 51*b*1 in the direction D1 orthogonal to the direction D2 parallel to one side of the vibrating plate 51 where the notched portion 51*b*1 is cut away is such that the dimension C5 of the near-central portion is shorter than the dimension S5 of the two jutting portions of the notched portion 51*b*1. As a result, the long dimension S5 of the two jutting portions of the notched portion 51*b*1 makes it possible to obtain the effect of decreasing the resonance frequency fc2 of the second natural vibration mode of the torsional vibration. In this event, even if the dimension C5 of the near-central portion is short, this portion is located on the torsion center axis Ma1 (first node) of the second natural vibration mode of the torsional vibration, and this portion does not vibrate. Accordingly, there is less influence on the resonance frequency fc2 of the second natural vibration mode of the torsional vibration. Further, the short dimension C5 of the near-central portion of the notched portion 51*b*1 makes it possible to provide the connecting portions 51*c*1, 51*c*2 at the vibration nodes, and to guarantee a sufficient area for the fixation by welding, bonding, or the like even when the protrusion 51*a* is taken into consideration. Besides, the two features according to the structure, the three features according to the vibration, and so forth are the same as those in the first embodiment.

Even with such a configuration, it is possible to shorten the dimension in the moving direction of the vibrator 50 of the vibration wave motor without impairing the thrust force, and to achieve the size reduction of a lens driver by using the vibrator 50 of this vibration wave motor, as in the case of the first embodiment. Note that modified examples and the like of this embodiment are also the same as those in the first embodiment.

The present invention is utilizable in electronic devices, particularly, lens drivers and the like, which are required to be compact and light weight and have a wide driving speed range.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-132421, filed Jul. 1, 2015, and Japanese Patent Application No. 2016-101019, filed May 20, 2016, which are hereby incorporated by reference herein in their entirety.

What is claimed is:

1. A vibration wave motor comprising:
   a vibrating plate having a substantially rectangular outline; and
   a piezoelectric element bonded to the vibrating plate and configured to vibrate, wherein
   the vibrating plate has a section not covered with the piezoelectric element inside a rectangular region encompassing the piezoelectric element within a plane where the piezoelectric element is bonded, the vibrating plate has a notched portion in the section not covered with the piezoelectric element, either one of the vibrating plate and the piezoelectric element is provided with a protrusion configured to perform an elliptic motion by vibrations of the piezoelectric element with different phases, and the notched portion on the vibrating plate includes a first notched portion and a second notched portion, with nodes of the vibration of the vibrating plate being located between the first notched portion and the second notched portion.

2. The vibration wave motor according to claim 1, wherein the notched portion is along a straight line which passes through the section and is parallel to one side of the outline of the vibrating plate, and the section is substantially line-symmetric with respect to the straight line.

3. The vibration wave motor according to claim 1, wherein the notched portion is along a straight line which passes through the section and is parallel to one side of the outline of the vibrating plate, and the notched portion is substantially line-symmetric with respect to the straight line.

4. The vibration wave motor according to claim 1, comprising two or more of the piezoelectric elements.

5. The vibration wave motor according to claim 1, wherein the vibration wave motor formed by integrating the vibrating plate, the piezoelectric element, and the protrusion with each other has natural vibration modes, one of the natural vibration modes at a resonance frequency matching with or similar to a resonance frequency of a natural vibration mode of a torsional vibration is a natural vibration mode of a bending vibration in a direction parallel to a torsion center axis of the natural vibration mode of the torsional vibration, the natural vibration mode of the torsional vibration has a first node which is the torsion center axis and a second node located in a direction orthogonal to the torsion center axis, the protrusion is provided at a position closer to the first node than to the second node, and the position where the protrusion is provided is closer to an antinode of the natural vibration mode of the bending vibration than to a node of the natural vibration mode of the bending vibration.

6. The vibration wave motor according to claim 5, wherein the natural vibration mode of the torsional vibration is a second natural vibration mode of the torsional vibration, and the natural vibration mode of the bending vibration is a first natural vibration mode of the bending vibration.

7. The vibration wave motor according to claim 1, wherein the protrusion is provided on a substantially rectangular surface of the vibrating plate.

8. The vibration wave motor according to claim 1, wherein a connecting portion to be directly or indirectly connected to a holding member configured to move in synchronism with the vibrating plate is provided to the section of the vibrating plate not covered with the piezoelectric element.

9. The vibration wave motor according to claim 8, wherein the connecting portion to be directly or indirectly connected to the holding member configured to move in synchronism with the vibrating plate is provided to the notched portion of the vibrating plate.

10. The vibration wave motor according to claim 1, wherein the notched portion has a shape with two jutting portions in a direction orthogonal to a direction parallel to one side of the vibrating plate where the notched portion is provided.

11. The vibration wave motor according to claim 10, wherein a connecting portion to be directly or indirectly connected to a holding member configured to move in synchronism with the vibrating plate is provided close to a near-central portion of the notched portion.

12. The vibration wave motor according to claim 1, wherein the vibrating plate moves along a fixed friction member.

13. The vibration wave motor according to claim 1, wherein the vibration wave motor is an ultrasonic motor in which the vibrations are ultrasonic vibrations.

14. A driver utilizing a vibration wave motor comprising a vibrating plate having a substantially rectangular outline and a piezoelectric element bonded to the vibrating plate has a section not covered with the piezoelectric element inside a rectangular region encompassing the piezoelectric element within a plane where the piezoelectric element is bonded, the vibrating plate has a notched portion in the section not covered with the piezoelectric element, either one of the vibrating plate and the piezoelectric element is provided with a protrusion configured to perform an elliptic motion by vibrations of the piezoelectric element with different phases, and the notched portion on the vibrating plate includes a first notched portion and a second notched portion, with nodes of the vibration of the vibrating plate being located between the first notched portion and the second notched portion.

15. A vibration wave motor comprising:

a vibrating plate having a substantially rectangular outline; and a piezoelectric element bonded to the vibrating plate and configured to vibrate, wherein the vibrating plate has a section not covered with the piezoelectric element inside a rectangular region encompassing the piezoelectric element within a plane where the piezoelectric element is bonded, the vibrating plate has a notched portion in the section not covered with the piezoelectric element, either one of the vibrating plate and the piezoelectric element is provided with a protrusion configured to perform an elliptic motion by vibrations of the piezoelectric element with different phases, the notched portion on the vibrating plate includes a first notched portion and a second notched portion, with nodes of the vibration of the vibrating plate being located between the first notched portion and the second notched portion, and the notched portion has a shape with two jutting portions in a direction orthogonal to a direction parallel to one side of the vibrating plate where the notched portion is provided.

\* \* \* \* \*